(12) United States Patent
Nakao (10) Patent No.: US 11,550,398 B2
(45) Date of Patent: Jan. 10, 2023

(54) ELECTRONIC APPARATUS

(71) Applicant: KYOCERA Corporation, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/296,071

(22) PCT Filed: Nov. 13, 2019

(86) PCT No.: PCT/JP2019/044598
§ 371 (c)(1),
(2) Date: May 21, 2021

(87) PCT Pub. No.: WO2020/110737
PCT Pub. Date: Jun. 4, 2020

(65) Prior Publication Data
US 2022/0011865 A1    Jan. 13, 2022

(30) Foreign Application Priority Data

Nov. 28, 2018 (JP) ............................. JP2018-222018

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
None
See application file for complete search history.

(56) References Cited

U.S. PATENT DOCUMENTS

| 9,606,628 B2 | 3/2017 | Taninaka et al. |
| 10,444,837 B2 | 10/2019 | Takeda et al. |
| 10,845,912 B2 * | 11/2020 | Park ...................... H01L 33/505 |
| 11,347,315 B2 * | 5/2022 | Yang ...................... G06F 3/016 |
| 2011/0115709 A1 | 5/2011 | Cruz-Hernandez |
| 2017/0038841 A1 * | 2/2017 | Takeda ................... G06F 3/041 |
| 2017/0220111 A1 * | 8/2017 | Nakamura ............ G06F 3/0416 |
| 2020/0301511 A1 * | 9/2020 | Tomaru .................. B60K 35/00 |
| 2020/0301561 A1 * | 9/2020 | Tomaru .................. G05G 25/00 |
| 2021/0132696 A1 * | 5/2021 | Yamauchi ............. G06F 3/0416 |

FOREIGN PATENT DOCUMENTS

| EP | 1310860 A1 | 5/2003 |
| JP | 4633167 B2 | 2/2011 |
| KR | 10-2016-0075019 A | 6/2016 |
| WO | 2014207842 A1 | 12/2014 |
| WO | 2015098062 A1 | 7/2015 |

* cited by examiner

*Primary Examiner* — Stephen T. Reed
(74) *Attorney, Agent, or Firm* — Studebaker & Brackett PC (57) ABSTRACT

An electronic apparatus includes a panel, a touch sensor, a plurality of the actuators, and a controller. The touch sensor is configured to detect a contact position on the panel. The plurality of the actuators are configured to vibrate the panel. The controller is configured to control such that accelerations of vibrations transmitted to the panel from the plurality of the actuators become maximum at the contact position at the same timing.

8 Claims, 10 Drawing Sheets

FIG. 10 ered to as
ELECTRONIC APPARATUS

CROSS REFERENCE TO RELATED APPLICATION

This application claims priority to and the benefit of Japanese Patent Application No. 2018-222018 filed on Nov. 28, 2018, the entire contents of which are incorporated herein by reference.

TECHNICAL FIELD

The present disclosure relates to an electronic apparatus. In particular, the present disclosure relates to an electronic apparatus that presents a tactile sensation.

BACKGROUND

A technique for presenting a realistic tactile sensation to a contact object such as an operator's finger or the like on a panel such as a touch panel is disclosed. For example, a tactile sensation presenting apparatus disclosed in PTL 1 set forth below provides an operator with an operation feeling accompanied by a "pushing" sensation by vibrating the panel in a thickness direction.

CITATION LIST

Patent Literature

PTL 1: Japanese Patent No. 4633167

SUMMARY

The electronic apparatus according to an embodiment includes a panel, a touch sensor, a plurality of actuators, and a controller.

The touch sensor detects a contact position on the panel.

The plurality of the actuators vibrate the panel.

The controller controls such that accelerations of vibrations transmitted to the panel from the plurality of the actuators become maximum at the contact position at the same timing.

DETAILED DESCRIPTION

It will be beneficial if a good tactile sensation can be presented efficiently to provide an operator with a good operation feeling. An object of the present disclosure is to provide an electronic apparatus that efficiently presents a good tactile sensation. According to the electronic apparatus of an embodiment, a good tactile sensation can be efficiently presented. Hereinafter, an electronic apparatus according to a first embodiment will be described with reference to the drawings.

The electronic apparatus according to the first embodiment may be a mobile phone, a srnartphone, a tablet computer, a laptop computer, a gaming terminal, or the like that is equipped with a touch sensor such as a touch panel. However, the electronic apparatus according to the embodiment is not limited to these mobile apparatuses and may be various electronic apparatuses including a desktop computer, a domestic appliance, an industrial device (an FA device), a home appliance, a special purpose terminal, or the like that is equipped with the touch sensor such as the touch panel.

Figure 1:
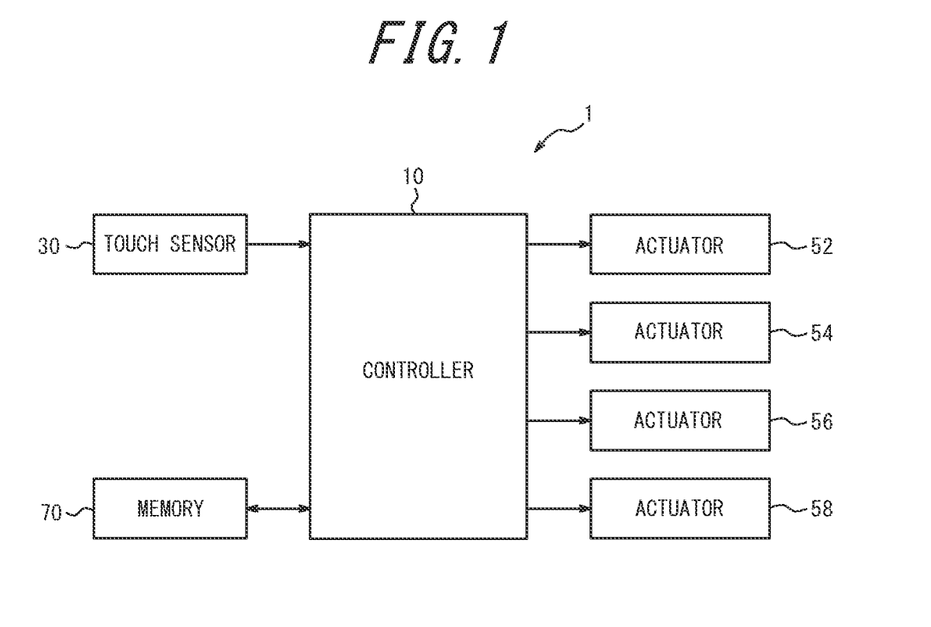
FIG. 1 is a functional block diagram illustrating a schematic configuration of an electronic apparatus according to a first embodiment.
Figure 2:
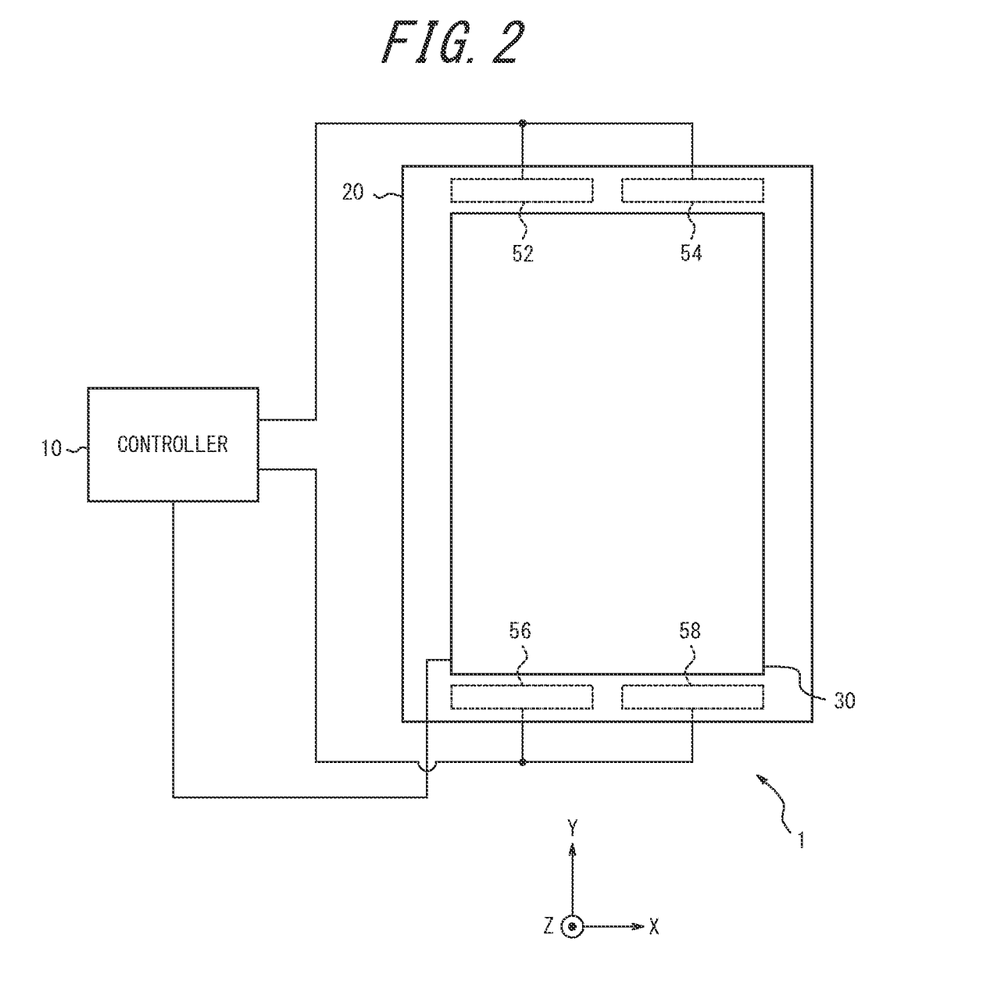
FIG. 2 is diagram illustrating an example arrangement of actuators in the electronic apparatus according to the first embodiment.

FIG. 1 is a block diagram illustrating a schematic configuration of the electronic apparatus according to the first embodiment. FIG. 2 is a diagram illustrating an example arrangement of actuators in the electronic apparatus according to the first embodiment.

As illustrated in FIG. 1 and FIG. 2, the electronic apparatus 1 according to the first embodiment includes a controller 10, a panel 20, a touch sensor 30, and a plurality of actuators 52, 54, 56, and 58. Hereinafter, when the plurality of the actuators such as the actuator 52, the actuator 54, the actuator 56, and the actuator 58 are not distinguished from one another, the actuators will collectively be referred to as "actuator 50", as appropriate. In FIG. 1, the panel 20 is omitted. As illustrated in FIG. 1, the electronic apparatus 1 according to the first embodiment may include a memory 70. As illustrated in FIG. 1, the controller 10 is electrically connected to the touch sensor 30, the plurality of the actuators 52, 54, 56, and 58, and the memory 70.

The controller 10 can control an operation of the entire electronic apparatus 1 including each functional unit constituting the electronic apparatus 1. The controller 10 may include at least one processor such as, for example, a CPU (Central Processing Unit) to provide a control and processing ability to perform various functions. The controller 10 may be realized by one processor in a collective manner, several processors, or individual processors. The processor may be implemented as an integrated circuit. The integrated circuit is also called an IC (Integrated Circuit). The processor may be implemented as a plurality of communicably connected integrated circuits and discrete circuits. The processor may be realized based on other various known techniques. in one embodiment, the controller 10 may he configured as, for example, a CPU and a program to he executed by the CPU. The controller 10 may appropriately include a memory required for the operation by the controller 10. The memory may store a program to be executed by the controller 10, a result of processing executed by the controller 10, and the like. Further, the memory may function as a working memory of the controller 10. The control performed by the controller 10 will be further described later.

The panel 20 is a member that is touched and/or pressed by an operator such as a user of the electronic apparatus 1. The panel 20 may include a contact surface (an operation surface) to be contacted and/or pressed by an operator's finger, a stylus pen, or the like (hereinafter, appropriately referred to as "contact object"). The panel 20 may be a plate-shaped member made of, for example, metal, glass, plastic, or the like. The panel 20 may be made of a material that can withstand contact and/or pressing by the operator. On the other hand, the panel 20 is vibrated by a plurality of the actuators 50, as will be described later. As such, the panel 20 may be formed from a material that appropriately transmits a vibration generated by the actuator 50.

The touch sensor 30 detects a position of contact (hereinafter, appropriately referred to as "contact position") made by the contact object with respect to the contact surface (the operation surface) of the panel 20. That is, the touch sensor 30 detects a contact position on the panel 20. The touch sensor 30 may be arranged on a front side (on a front surface side, i.e., a positive Z-axis direction side) of the panel 20, as illustrated in FIG. 2. The touch sensor 30 arranged in this way can detect the contact position on the panel 20. The electronic apparatus 1 illustrated in FIG. 2 can detect the contact position in a region where the touch sensor 30 is arranged on the panel 20. To detect a contact, the touch sensor 30 may employ any method including a capacitance method, a resistance film method, a surface acoustic wave method (or an ultrasonic method), an infrared method, an electromagnetic induction method, a load detection method, or the like. The touch sensor 30 outputs information regarding the position (the contact position) where the contact object is in contact with a contact detection surface to the controller 10, based on detection of the contact made by the contact object. This output enables the controller 10 to acquire the contact position on the panel 20 detected by the touch sensor 30. In the electronic apparatus 1 illustrated in FIG. 2, the touch sensor 30 has an area smaller than that of the panel 20. However, the touch sensor 30 may be configured in the same size as the panel 20.

The touch sensor 30 may be made from, for example, a transparent member and may be arranged on the front side (the front surface side) of the panel 20. In this case, a display that can be composed of a display device such as a liquid crystal display (LCD), an organic electroluminescent display, or an inorganic electroluminescent display may be provided on a rear side (a rear surface side, i.e., a negative Z-axis direction side) of the panel 20. In FIG. 1 and FIG. 2, the display is omitted. The configuration including the display can display, for example, an object depicting a key, a button, or an icon and detect a pressing operation in which the operator touches/contacts the object, using the touch sensor 30. The display may be attached to the rear surface side of the touch sensor 30 by a joining member such as a double-sided tape. The display may be attached to the rear surface side of the touch sensor 30 via an intermediate member such as, for example, a sheet metal or may be attached to another support member.

In one embodiment, the panel 20 may have a touch sensor function. In this case, the touch sensor 30 does not need to be provided as a separate functional unit. For example, the panel 20 configured using a touch sensor can detect a position where the operator touches the panel 20. Alternatively, the display may be configured using a translucent touch sensor as the panel 20 and arranging a display device such as the LCD on the rear surface side of the panel 20. This configuration can suggest a position where the operator needs to touch by displaying an image such as the icon on the display. Hereinafter, presentation of a tactile sensation by the electronic apparatus 1 will be mainly described, and a description of a function of displaying an image and the like will be omitted.

The plurality of the actuators 50 vibrate the panel 20 to generate a vibration in a predetermined vibration pattern on the contact surface (the operation surface) of the panel 20. The plurality of the actuators 50 are configured to vibrate the panel 20 by transmitting the vibrations thereto. The actuator 50 may be configured using, for example, a piezoelectric vibrator (a piezoelectric element) or the like. The actuator 50 may be a functional unit other than the piezoelectric vibrator (the piezoelectric element) that can transmit a good vibration to the panel 20.

As illustrated in FIG. 2, the electronic apparatus 1 according to the first embodiment includes four actuators 50. In the electronic apparatus 1, in particular, the actuators 52 and 54 are arranged in the vicinity of an upper end (a positive Y-axis direction side) of the panel 20 in a manner substantially parallel to the X-axis. In the electronic apparatus 1, further, the actuators 56 and 58 are arranged in the vicinity of a lower end (a negative Y-axis direction side) of the panel 20 in a manner substantially parallel to the X-axis. In FIG. 2, the actuator 50 is illustrated by broken lines to indicate that the actuator 50 is provided on the rear side (the rear surface side, i.e., the negative Z-axis direction side) of the touch sensor 30. The arrangement of the actuator 50 is not limited to an example illustrated in FIG. 2, and various arrangements can be adopted depending on factors such as a mode of a tactile sensation to be presented by the electronic apparatus 1. Further, the number of the actuators 50 to be arranged is not limited to four and may be any number more than one. The actuator 50 is attached to the touch sensor 30 by a joining member (e.g., the double-sided tape). The actuator 50 may be attached to the touch sensor 30 via an intermediate member (e.g., sheet metal).

In one embodiment, the plurality of the actuators 50 present the tactile sensation to the contact object in contact with the panel 20 by generating a vibration on the contact detection surface of the touch sensor 30. When presenting the tactile sensation to the contact object using the vibrations of the plurality of the actuators 50, the controller 10 supplies a driving signal for presenting a predetermined tactile sensation at an appropriate timing. The driving signal output by the controller 10 for presenting the tactile sensation as described above will be described later. In FIG. 2, further, the actuators 52 and 54 arranged on an upper side and the actuators 56 and 58 arranged on a lower side are illustrated to indicate that the driving signals are supplied from the controller 10 via respective signal lines shared therebetween. However, different driving signals may be supplied to each of the four actuators 50 from the controller 10.

The memory 70 stores various information received from the controller 10. The memory 70 also stores a program or the like to be executed by the controller 10. The memory 70 may also store various data such as a result of a calculation performed by the controller 10. Further, the memory 70 may also include the working memory or the like to be used during operation by the controller 10.

The memory 70 may be configured using, for example, a semiconductor memory, a magnetic disk, or the like. However, the memory 70 is not limited thereto to and may be any storage device. For example, the memory 70 may be a storage medium such as a memory card inserted into the electronic apparatus 1 according to the present embodiment. Further, the memory 70 may be an internal memory of the CPU used as the controller 10.

A housing to which the panel 20 including the touch sensor 30 and the plurality of the actuators 50 is attached is omitted in FIG. 2. The panel 20 is attached to the housing or the like constituting a main body of the electronic apparatus 1 at the final stage. Other necessary circuits and functional units such as the controller 10 and the memory 70 illustrated in FIG. 1 may be enclosed in the housing. In this case, the panel 20 may he arranged on the housing or the like using an appropriate means in a manner to be able to vibrate. That is, in a case in which all the peripheral sides of the panel 20 are firmly fixed to the housing or the like, a vibration of the panel 20 cannot have sufficient amplitude, and the panel 20 may have a trouble presenting a good tactile sensation to the operator. Accordingly, for example, the panel 20 is arranged on the housing via an elastic member or partially fixed to the housing to be able to vibrate.

Figure 3:
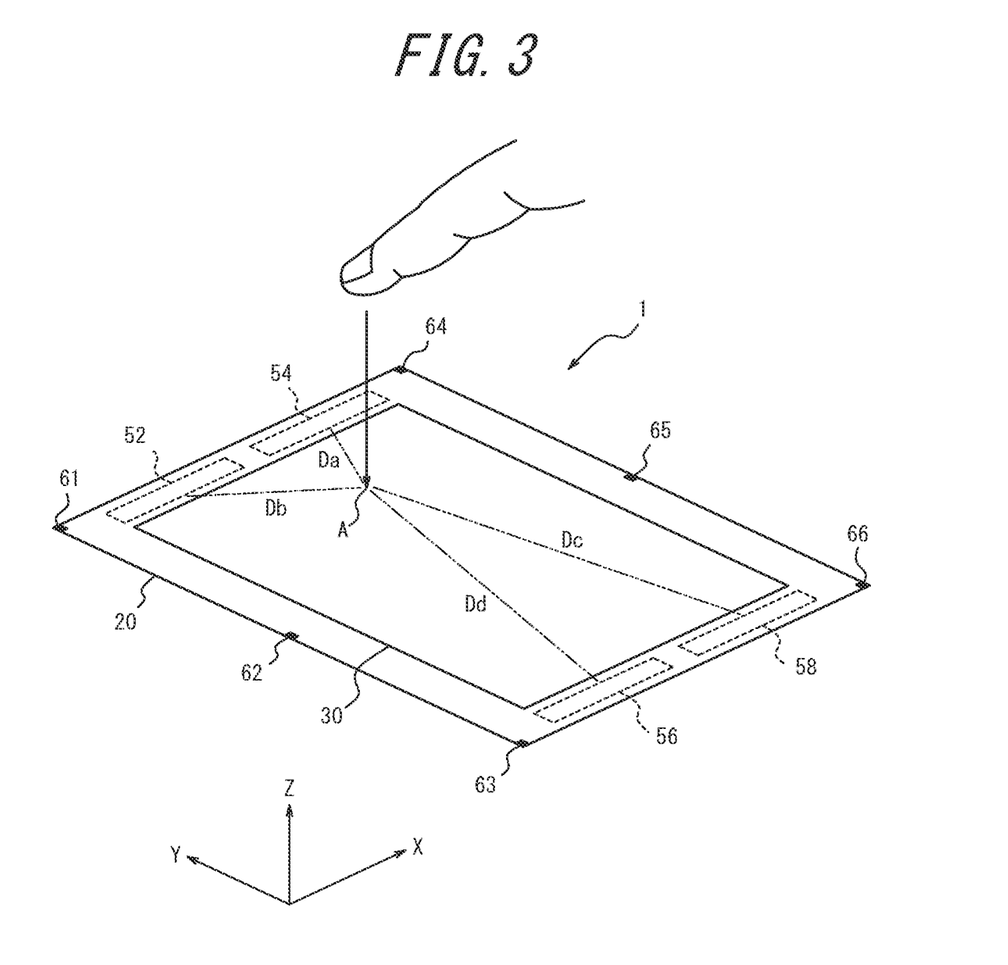
FIG. 3 is a diagram for explaining detection of a contact by the electronic apparatus according to the first embodiment.

FIG. 3 is a diagram illustrating contact detection performed by the electronic apparatus 1.

FIG. 3 illustrates an arranging configuration of each main functional unit of the electronic apparatus 1 from a viewpoint different from that of FIG. 2. FIG. 3 is a perspective view of the panel 20 of the electronic apparatus 1 illustrated in FIG. 2. In FIG. 3, the controller 10 illustrated in FIG. 1 and a connection mode with respect to the controller 10 are omitted. In FIG. 3, further, illustration of the housing to which the panel 20 is attached is also omitted.

In the present embodiment, as illustrated in FIG. 3, the panel 20 is attached to the housing or the like mentioned above in a manner being supported at six support points 61, 62, 63, 64, 65, and 66. That is, the panel 20 is fixed to some extent at the support points 61 to 66. However, if the panel 20 is excessively firmly fixed at the support points 61 to 66, the vibration of the panel 20 may be hindered. Thus, the panel 20 may be arranged in a manner to be able to vibrable while being supported by the support points 61 to 66. For example, the panel 20 may be arranged on the housing or the like at the support points 61 to 66 via an elastic member, or portions of the housing or the like receiving the support points 61 to 66 may be firmed from an elastic member. An attaching position of the panel 20 to the housing housing or the like is not limited to the arranging configuration illustrated in FIG. 3, and the number of support points is not limited to six. The positions and the number of the support points may be adjusted according to a mode of the tactile sensation to be presented by the electronic apparatus 1.

In the present embodiment, as illustrated in FIG. 3, for example, the controller 10 determines whether a contact made by the contact object such as the operator's finger or the like is detected at a predetermined position (e.g., a position A) on the touch sensor 30. Upon detection of the contact at the predetermined position, the controller 10 drives each of the plurality of the actuators 50 and starts controlling the timing at which each of the plurality of the actuators 50 generates the vibration.

As a result, the tactile sensation is presented to the contact object that is in contact with and/or pressing the panel 20. In the present embodiment, in a case in which the object such as the icon or the button is displayed on the display to receive an operation by the operator, the tactile sensation may be presented when the position where the contact is detected on the touch sensor 30 corresponds to the displayed object. This configuration enables the operator to recognize, through the tactile sensation, that the contact or the pressing operation made by the operator in respect to the object such as the icon or the bottom has been correctly recognized by the electronic apparatus 1.

Next, the operation in which the plurality of the actuators 50 generate vibrations in the electronic apparatus 1 according to the present embodiment will be described.

The electronic apparatus 1 according to the present embodiment presents the tactile sensation by vibrating the plurality of the actuators 50 using the driving signals from the controller 10. Hereinafter, a case in which the same driving signals are supplied to the actuators 52, 54, 56, 58 from the controller 10 such that the actuators 52, 54, 56, 58 generate vibrations in the same mode will be described. Further, the controller 10 will be described to transmit the driving signal to each of the plurality of the actuators 52, 54, 56, and 58 at the timing when a contact position A on the panel 20 is detected by the touch sensor 30. In this case, each of the plurality of the actuators 52, 54, 56, and 58 will be described to immediately start generation of the vibration at the timing when the driving signals from the controller 10 are received.

As illustrated in FIG. 3, the operator of the electronic apparatus 1 is assumed to have touched or pressed the position A of the touch sensor 30 arranged on the panel 20. In this case, the touch sensor 30 detects the contact position A on the panel 20 and supplies a signal corresponding to the contact position A to the controller 10. Here, the position A is a slightly upper right point on the panel 20 (Note that a positive direction of the X-axis is considered to be a right direction, and a positive direction of the Y-axis is considered to be an upward direction.).

As can be seen from FIG. 3, each of the plurality of the actuators 52, 54, 56 and 58 may have different distances to the contact position A. In a case of an example illustrated in FIG. 3, a distance Da from the actuator 54 to the contact position A is the shortest, followed by a distance Db from the actuator 52 to the contact position A, a distance Dc from the actuator 58 to the contact position A, and a distance Dd from the actuator 56 to the contact position A. That is, the distances from the plurality of the actuators 50 to the contact position A illustrated in FIG. 3 can be expressed as Da<Db<Dc<Dd. Because the distances from the plurality of the actuators 50 to the contact position A are different from one another as described above, if the plurality of the actuators 50 generate vibrations at the same timing, the timing at which the vibrations reach the contact position A will be varied. Hereinafter, such a situation will be further described.

FIG. 4A to 4D are diagrams illustrating temporal variations of a displacement of the panel 20 at the contact position A caused by the vibrations transmitted from the plurality of the actuators 54, 52, 58, and 56. In FIG. 4A to FIG. 4D, a start point of a time axis may be a timing at which the contact position A is detected by the touch sensor 30. FIG.

Figure 4A:
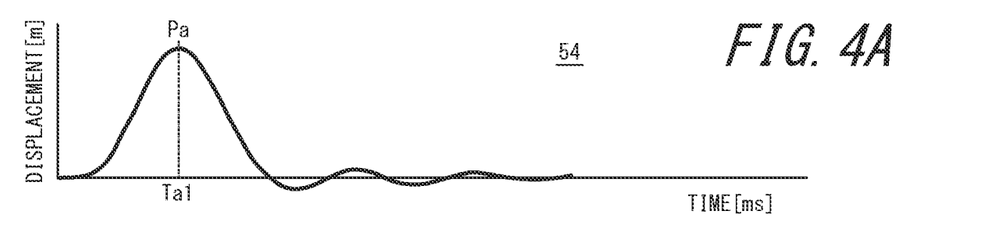
FIG. 4A is a diagram illustrating an operation of the electronic apparatus according to the first embodiment.
Figure 4B:
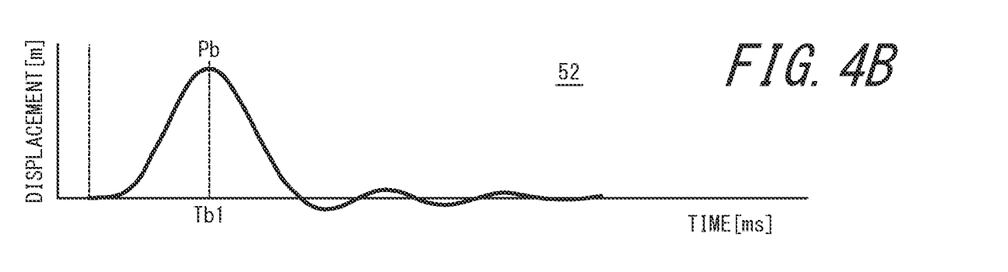
FIG. 4B is a diagram illustrating an operation of the electronic apparatus according to the first embodiment.
Figure 4C:
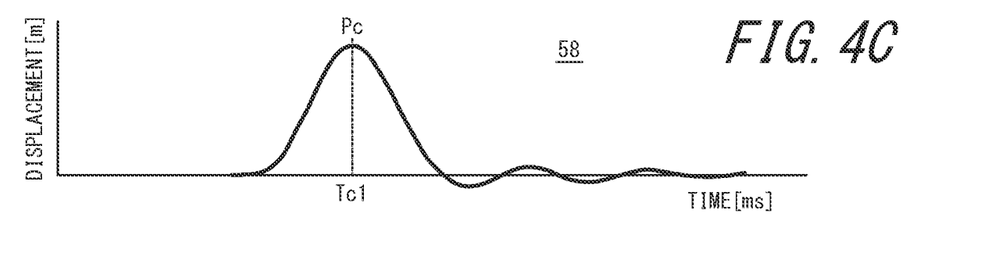
FIG. 4C is a diagram illustrating an operation of the electronic apparatus Ire according to the first embodiment.
Figure 4D:
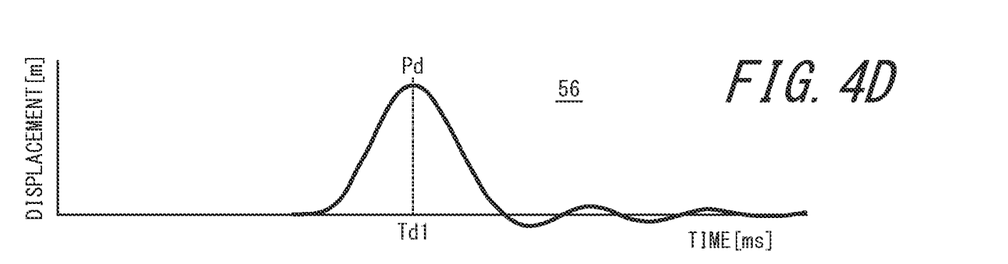
FIG. 4D is a diagram illustrating an operation of the electronic apparatus according to the first embodiment.

4A is a graph illustrating a temporal variation of the displacement of the panel 20 observed at the contact position A when the actuator 54 alone is driven to vibrate the panel 20. FIG. 4B is a graph illustrating a temporal variation of the displacement of the panel 20 observed at the contact position A when the actuator 52 alone is driven to vibrate the panel 20. FIG. 4C is a graph illustrating a temporal variation of the displacement of the panel 20 observed at the contact position A when the actuator 58 alone is driven to vibrate the panel 20. FIG. 4D is a graph illustrating a temporal variation of the displacement of the panel 20 observed at the contact position A when the actuator 56 alone is driven to vibrate the panel 20.

As illustrated in FIG. 4A to FIG. 4D, the displacement of the panel 20 observed at the contact position A causes a time lag depending on the distance in which the vibration is transmitted from the plurality of the actuators 50. Thus, if the plurality of the actuators 50 are simultaneously driven at the timing when the contact position A is detected by the touch sensor 30, timings at which the displacement of the panel 20 is increased vary. In examples illustrated in FIG. 4A to FIG. 4D, displacement peaks Pa, Pb, Pc, and Pd of the panel 20 caused by the vibrations of the plurality of the actuators 50 occur at dispersed timings.

For example, in the examples illustrated in FIG. 4A to FIG. 4D, the displacement of the panel 20 observed at the contact position A can be represented by a composite of waveforms illustrated in FIG. 4A to FIG. 4D. Thus, when the displacement peaks Pa, Pb, Pc, and Pd of the panel 20 caused by the vibrations of the plurality of the actuators 50 occur at dispersed timings, a generated tactile sensation can be weakened, possibly hindering efficient presentation of a good tactile sensation.

However, for example, by synchronizing the timings at which the displacement of the panel 20 caused by the vibrations of the plurality of the actuators 50 becomes maximum, the displacement of the panel 20 at the contact position A can be increased. That is, by synchronizing the displacement peaks Pa, Pb, Pc, and Pd illustrated in FIG. 4A to FIG. 4D, the displacement of the panel 20 at the contact position A can be increased. For example, time points Ta1, Tb1, and Tc1 at which the displacement of the panel 20 becomes maximum respectively by the vibrations of the actuators 54, 52, and 58 may be synchronized with a time point Td1 at which the displacement of the panel 20 becomes maximum by the vibration of the actuator 56. In this case, the respective time points Ta1, Tb1, Tc1 may be delayed such that the time point at which the displacement of the panel 20 becomes maximum by the vibrations of the actuators 54, 52, and 58 coincide with the time point Td1.

For example, the controller 10 may delay the time point to drive the actuator 54 by a time (Td1−Ta1) from the time point at which the contact position A is detected by the touch sensor 30. Further, the controller 10 may delay the time point to drive the actuator 52 by a time (Td1−Tb1) from the time point at which the contact position A is detected by the touch sensor 30. Further, the controller 10 may delay the time point to drive the actuator 58 by a time (Td1−Tc1) from the time point at which the contact position A is detected by the touch sensor 30. By controlling in this manner, the electronic apparatus 1 can maximize the displacement of the panel 20 at the time point Td1 caused by the vibrations transmitted to the contact position A from the plurality of the actuators 50.

FIG. 4A to FIG. 4D illustrate an example in which the controller 10 supplies the same driving signals from the plurality of the actuators 50. As a result, FIG. 4A to FIG. 4D illustrate the example in which substantially the same waveforms were observed as the displacement of the panel 20 at the contact position A, with a time lag therebetween.

However, when the displacement of the panel 20 at the contact position A is actually observed, there may be cases in which the same waveforms that are temporally deviated as illustrated in FIGS. 4A to 4D are not obtained. The temporal variation of the displacement of the panel 20 at the contact position A caused by the vibration transmitted from each of the plurality of the actuators 50 varies depending on various conditions. The various conditions include, for example, vibration transmission characteristics of the panel 20, synthesis of the panel 20, strength of the panel 20, a configuration mode in which the panel 20 is arranged on the housing, an arrangement of the actuator 50, an installation mode of the actuator 50, or the like. Further, the displacement of the panel 20 caused by the vibration transmitted from each of the plurality of the actuators 50 greatly varies depending on the contact position. That is, when the temporal variation of the displacement of the panel 20 caused by the vibration transmitted from each of the plurality of the actuators 50 is measured at a position different from the contact position A of the panel 20, a measurement result may be different from those illustrated in FIG. 4A to FIG. 4D.

Accordingly, before shipping of the electronic apparatus 1 or the like, the temporal variation of the displacement of the panel 20 caused by the vibration transmitted from each of the plurality of the actuators 50 may be actually observed at a plurality of positions on the panel 20. In this case, the panel 20 may be divided into a plurality of predetermined regions, and the temporal variation of the displacement of the panel 20 caused by the vibration transmitted from each of the plurality of the actuators 50 may be observed in each of the regions. Further, a result of this observation may be stored in the memory 70. In a case in which the result of the observation described above is stored in the memory 70, the temporal variation of the displacement of the panel 20 at the plurality of positions of the panel 20 caused by the vibration transmitted from each of the plurality of the actuators 50 can be read out. Thus, the controller 10 may adjust the timing to drive each of the plurality of the actuators 50, based on the temporal variation of the displacement of the panel 20 caused by the vibration transmitted from each of the plurality of the actuators 50.

In the electronic apparatus 1 according to the embodiment, by synchronizing the timings at which the displacement of the panel 20 by the vibrations of the plurality of the actuators 50 becomes maximum, the displacement of the panel 20 at the contact position A can be increased.

On the other hand, we found that there is a viewpoint other than a viewpoint of increasing the displacement of the panel 20 at the contact position to efficiently present a good tactile sensation. In the dermis layer or the subcutaneous tissue of the human body, there are receptors called the Pacinian corpuscle having a layered structure. The Pacinian corpuscles sense all pressure changes and vibrations and are believed to be particularly sensitive to vibrations. The Pacinian corpuscles are believed to be able to sense high-frequency vibrations, with the highest sensitivity at a frequency around 200 Hz. Also, the Pacinian corpuscles are believed to detect an acceleration of a skin displacement. Thus, to efficiently exhibit a good tactile sensation, an acceleration of a vibration of the panel 20 may be increased at the contact position. The good tactile sensation is, for example, a realistic click tactile sensation similar to that obtained by operating a push button switch. According to the present disclosure, the realistic tactile sensation can be efficiently presented to the user. According to the present disclosure, further, the realistic tactile sensation as described above can be presented to the user with low power consumption. Hereinafter, an embodiment of a configuration as described above will be described.

FIG. 5A to FIG. 5D are graphs illustrating the accelerations of the vibration of the panel 20, based on the displacement of the panel 20 caused by the vibrations of the plurality of the actuators 50 illustrated in FIG. 4A to FIG. 4D. That is, FIG. 5A to FIG. 5D are diagrams illustrating waveforms of the graph indicating the accelerations of the vibration of the panel 20, obtained from the waveform of the graph indicating the displacement of the panel 20 illustrated in FIG. 4A to FIG. 4D. Because FIG. 4A to FIG. 4D illustrate the temporal variation of the displacement of the panel 20, the accelerations of the displacement as illustrated in FIG. 5A to FIG. 5D can be obtained by performing second-order differentializing on a function of the displacement with respect to time.

In the electronic apparatus 1 according to the embodiment, the controller 10 controls such that the accelerations of the vibration of the panel 20 become maximum at the contact position.

Figure 5A:
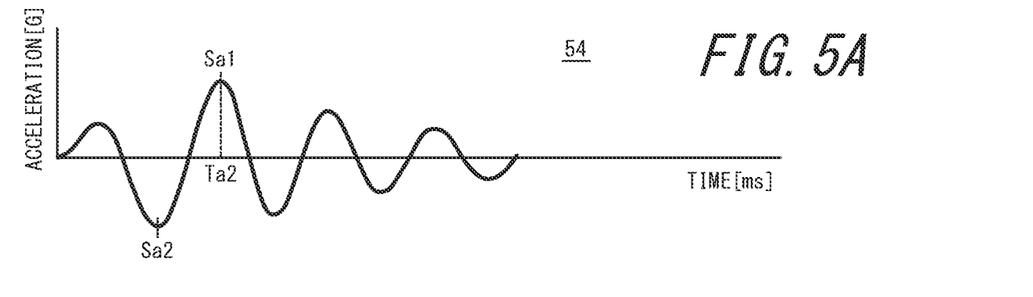
FIG. 5A is a diagram illustrating an operation of the electronic apparatus according to the first embodiment.
Figure 5B:
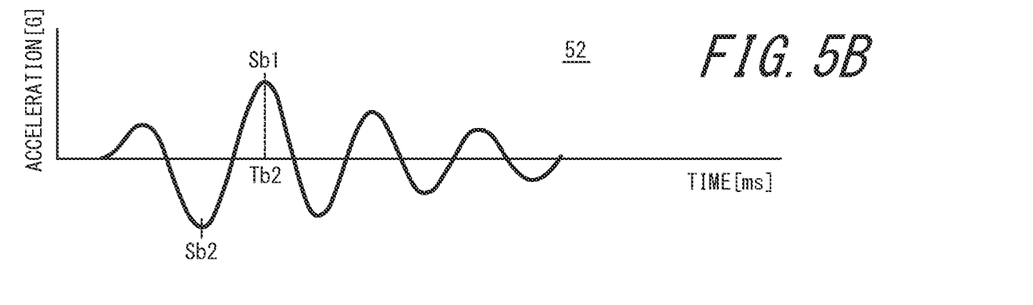
FIG. 5B is a diagram illustrating an operation of the electronic apparatus according to the first embodiment.
Figure 5C:
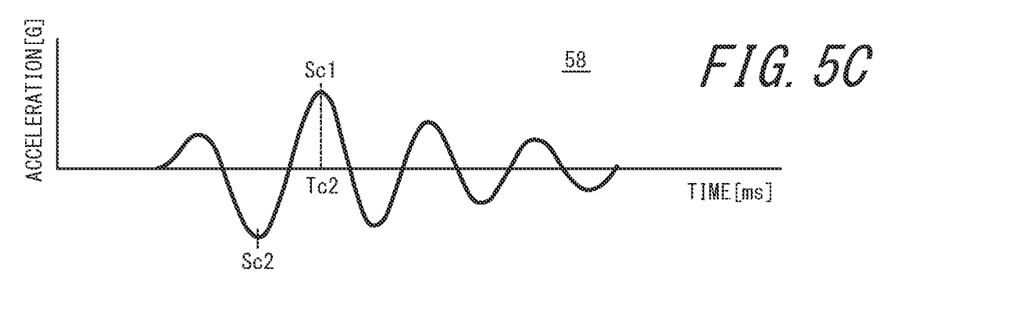
FIG. 5C is a diagram illustrating an operation of the electronic apparatus according to the first embodiment.
Figure 5D:
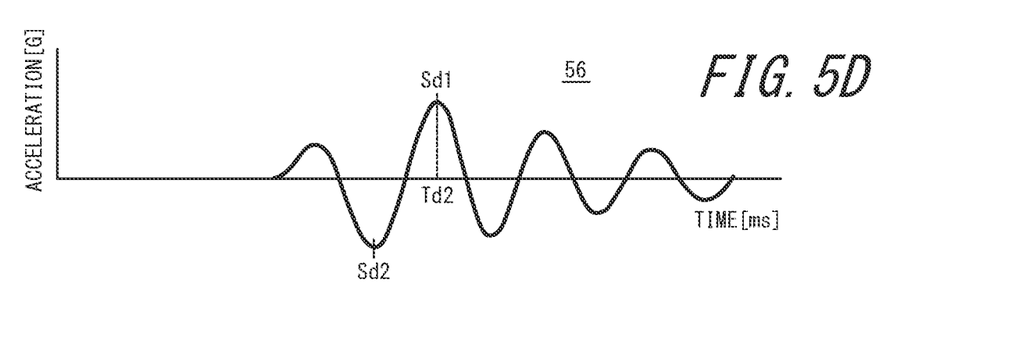
FIG. 5D is a diagram illustrating an operation of the electronic apparatus according to the first embodiment.

FIG. 5A to FIG. 5D are diagrams respectively illustrating a temporal variation of the acceleration at the contact position A on the panel 20 caused by the vibration transmitted from each of the plurality of the actuators 54, 52, 58, and 56. In FIG. 5A to FIG. 5D, a start point of a time axis may be the timing at which the contact position A is detected by the touch sensor 30. FIG. 5A is a graph illustrating the temporal variation of the acceleration of the vibration of the panel 20 observed at the contact position A when the panel 20 is vibrated by driving the actuator 54 alone. FIG. 5B is a graph illustrating the temporal variation of the acceleration of the vibration of the panel 20 observed at the contact position A when the panel 20 is vibrated by driving the actuator 52 alone. FIG. 5C is a graph illustrating the temporal variation of the acceleration of the vibration of the panel 20 observed at the contact position A when the panel 20 is vibrated by driving the actuator 58 alone. FIG. 5D is a graph illustrating the temporal variation of the acceleration of the vibration of the panel 20 observed at the contact position A when the panel 20 is vibrated by driving the actuator 56 alone.

As illustrated in FIG. 5A to FIG. 5D, the acceleration of the vibration of the panel 20 observed at the contact position A causes a time lag depending on the distance in which the vibration is transmitted from the plurality of the actuators 50. Thus, when the plurality of the actuators 50 are simultaneously driven at the timing when the contact position A is detected by the touch sensor 30, the timings at which the displacement of the panel 20 increases does not coincide. In the examples illustrated in FIG. 5A to FIG. 5D, acceleration peaks Sa1, Sb1, Sc1 and Sd1 of the panel 20 caused by the vibrations of the plurality of the actuators 50 occur at dispersed timings.

For example, in the examples illustrated in FIG. 5A to FIG. 5D, the acceleration of the vibration of the panel 20 observed at the contact position A can be expressed by a composite of the waveforms illustrated in FIG. 5A to FIG. 5D. Thus, when the acceleration peaks Sa1, Sb1, Sc1, Sd1 of the panel 20 caused by the vibrations of the plurality of the actuators 50 occur at the dispersed timings, efficient presentation of a good tactile sensation may be hindered.

However, for example, by synchronizing the timings at which the acceleration of the panel 20 caused by the vibrations of the plurality of the actuators 50 becomes maximum, the acceleration of the vibration of the panel 20 at the contact position A can be increased. That is, by synchronizing the acceleration peaks Sa1, Sb1, Sc1 and Sd1 illustrated in FIG. 5A to FIG. 5D, the acceleration of the vibration of the panel 20 at the contact position A can be increased. For example, time points Ta1, Tb2, and Tc2 at which the acceleration of the panel 20 becomes maximum by the vibrations of the actuators 54, 52, and 58 may be synchronized with a time point Td2 at which the acceleration of the panel 20 becomes maximum by the vibration of the actuator 56. In this case, the respective time points Ta2, Tb2, and Tc2 may be delayed, such that the time points at which the accelerations of the panel 20 caused by the vibrations of the actuators 54, 52, and 58 become maximum coincide with the time point Td2.

For example, the controller 10 may delay the time point to drive the actuator 54 by a time (Td2−Ta2) from the time point at which the contact position A is detected by the touch sensor 30. The controller 10 may delay the time point to drive the actuator 52 by a time (Td2−Tb2) from the time point at which the contact position A is detected by the touch sensor 30. Further, the controller 10 may delay the time point to drive the actuator 58 by a time (Td2−Tc2) from the time point at which the contact position A is detected by the touch sensor 30. By controlling as described above, the electronic apparatus 1 can maximize the accelerations of the panel 20 caused by the vibrations transmitted to the contact position A from the plurality of the actuators 50 at the time point Td2.

FIG. 5A to FIG. 5D illustrate the example in which the controller 10 supplies the same driving signals from the plurality of the actuators 50. As a result, FIG. 5A to 5D illustrate the example in which substantially the same waveforms were observed as the accelerations of the vibrations of the panel 20 at the contact position A, with a time lag therebetween.

As described above, however, when the displacement of the panel 20 at the contact position A is actually observed, different waveforms can be formed, rather than the same waveforms having temporal deviations as illustrated in FIG. 4A to FIG. 4D. Thus, when the acceleration of the vibration of the panel 20 at the contact position A is actually observed, different waveforms can be formed, rather than the same waveforms having temporal deviations as illustrated in FIG. 5A to FIG. 5D. As described above, further, the displacement of the panel 20 caused by the vibration transmitted from each of the plurality of the actuators 50 varies greatly depending on the contact position. Thus, the acceleration of the panel 20 caused by the vibration transmitted from each of the plurality of the actuators 50 also varies greatly depending on the contact position.

Accordingly, before shipping of the electronic apparatus 1 or the like, the temporal variation of the acceleration of the panel 20 caused by the vibration transmitted from each of the plurality of the actuators 50 may be actually observed at a plurality of positions on the panel 20. In this case, the panel 20 may be divided into a plurality of predetermined regions, and the temporal variation of the acceleration of the panel 20 caused by the vibration transmitted from each of the plurality of the actuators 50 may be observed in each of the regions. Results of such an observation may be stored in the memory 70. That is, the memory 70 may store the temporal variation of the acceleration of the vibration transmitted to the panel 20 from each of the plurality of the actuators 50 at the plurality of positions on the panel 20. In a case in which the observation results as described above are stored in the memory 70, the temporal variation of the acceleration of the panel 20 caused by the vibration transmitted from each of the plurality of the actuators 50 at the plurality of positions of the panel 20 can be read out. Thus, the controller 10 may adjust the timing to drive each of the plurality of the actuators 50, based on the temporal variation of the acceleration of the panel 20 caused by the vibration transmitted from each of the plurality of the actuators 50.

Further, the memory 70 may store the time (Td2−Ta2), the time (Td2−Tb2), and the time (Td2−Tc2) for each of the plurality of positions on the panel 20. The controller 10 delays the timing to drive each of the actuators 50 by the time stored in the memory 70 from the time when the contact position A is detected by the touch sensor 30. By controlling in this manner, the electronic apparatus 1 can maximize the acceleration of the panel 20 caused by the vibrations transmitted to the contact position A from the plurality of the actuators 50, at the time point Td2. According to the present disclosure, the controller 10 can perform arithmetic processing at a high speed.

In the electronic apparatus 1 according to the embodiment, by synchronizing the timings at which the accelerations of the panel 20 caused by the vibrations of the plurality of the actuators 50 become maximum, a good tactile sensation can be efficiently presented at the contact position A.

In the electronic apparatus 1 according to the embodiment, as described above, the controller 10 controls such that the accelerations of the vibrations transmitted to the panel 20 from the plurality of the actuators 50 become maximum at the same timings. The controller 10 may control the respective timings at which the plurality of the actuators 50 generate vibrations, such that the accelerations of the vibrations transmitted to the panel 20 from the plurality of the actuators 50 become maximum at the same timing, The controller 10 may adjust the timing at which at least one of the plurality of the actuators 50 generates the vibration, according to the time when the vibration generated by each of the plurality of the actuators 50 reaches the contact position.

According to the electronic apparatus 1 of the embodiment, the accelerations of the vibrations transmitted to the panel 20 from the plurality of the actuators 50 simultaneously become maximum at the contact position detected by the touch sensor 30. According to the electronic apparatus 1 of the embodiment, thus, the operator's Pacinian corpuscle, i.e., the receptor that sensitively responds to the acceleration of the vibration can be satisfactorily stimulated. According to the electronic apparatus 1 of the embodiment, thus, the acceleration of the vibration can become maximum without maximizing, for example, the displacement (the amplitude) of the vibration or an intensity of the vibration. According to the electronic apparatus 1 of the embodiment, thus, a good tactile sensation can be efficiently presented.

For example, when the electronic apparatus 1 is a small terminal device or the like, it is assumed that the amplitude or the intensity of the vibration caused by the plurality of the actuators 50 is limited, from a viewpoint of a space within the housing and/or power consumption. In this case also, the electronic apparatus 1 according to the embodiment can maximize the acceleration of the vibration and thus efficiently present a good tactile sensation.

In the electronic apparatus 1 according to the embodiment, the amplitude, the frequency, the power consumption, and/or an amplitude mode involved in vibrations of the panel 20 using the plurality of the actuators 50 may be determined in any appropriate manner. For example, in the electronic apparatus 1 according to one embodiment, by adjusting the amplitude and/or the frequency for vibrating the panel 20 using the plurality of the actuators 50, a uniform tactile sensation that does not relay on a contact position on the panel 20 may be presented. In this case also, the electronic apparatus 1 according to the embodiment can efficiently present a good tactile sensation and thus present a good tactile sensation that gives the operator, for example, an assuring sensation with a small amount of energy.

In the above description, the acceleration peaks Sa1, Sb1, Sc1 and Sd1 of the vibrations caused by the plurality of the actuators 50 are controlled to be generated at the same time (see FIG. 5A to FIG. 5D). However, in one embodiment the controller 10 may control to synchronize timings at which peak-to-peak values of the accelerations of the vibrations by the plurality of the actuators 50 become maximum.

As illustrated in FIG. 5A, for example, when the acceleration of the vibration of the panel 20 caused by the actuator 54 increases from a minimum value Sa2 to a maximum value Sa1, the peak-to-peak value becomes maximum (at the time point Ta2). As illustrated in FIG. 5B, also, when the acceleration of the vibration of the panel 20 caused by the actuator 52 increases from a minimum value Sb2 to a maximum value Sb1, the peak-to-peak value becomes maximum (at the time point Tb2). As illustrated in FIG. 5C, also, when the acceleration of the vibration of the panel 20 caused by the actuator 58 increases from a minimum value Sc2 to a maximum value Sc1, the peak-to-peak value becomes maximum (at the time point Tc2). As illustrated in FIG. 5D, further, when the acceleration of the vibration of the panel 20 caused by the actuator 56 increases from a minimum value Sd2 to a maximum value Sd1, the peak-to-peak value becomes maximum (at the time point Td2). Thus, the controller 10 may control such that the timing at which these peak-to-peak values become maximum simultaneously. As described above, in one embodiment the controller 10 may control such that the increases in the accelerations of the vibrations transmitted to the panel 20 from the plurality of the actuators 50 from the minimum value to the maximum value simultaneously become maximum at the contact position.

Further, in the above description the control is performed such that the peaks of the accelerations of the vibrations caused by the plurality of the actuators 50 occur simultaneously. Here, however, the term "simultaneously" is not limited to be simultaneous in a strict sense. In the present disclosure, the term "simultaneously" may be "at similar time points" such as, for example, "almost simultaneously". In the present disclosure, further, the term "simultaneously" may be within a predetermined time period with a slight time rang including the same time points. However, if the "predetermined time period" becomes excessively long, the timing at which the acceleration increases may be dispersed. Here, thus, the "predetermined time period" may be a short time period to the extent where the timings at which the increases in the accelerations are not dispersed. As described above, in one embodiment the controller 10 may control such that the accelerations of the vibrations transmitted to the panel 20 from the plurality of the actuators 50 become maximum at the contact position within the predetermined time including the same timing.

Figure 6:
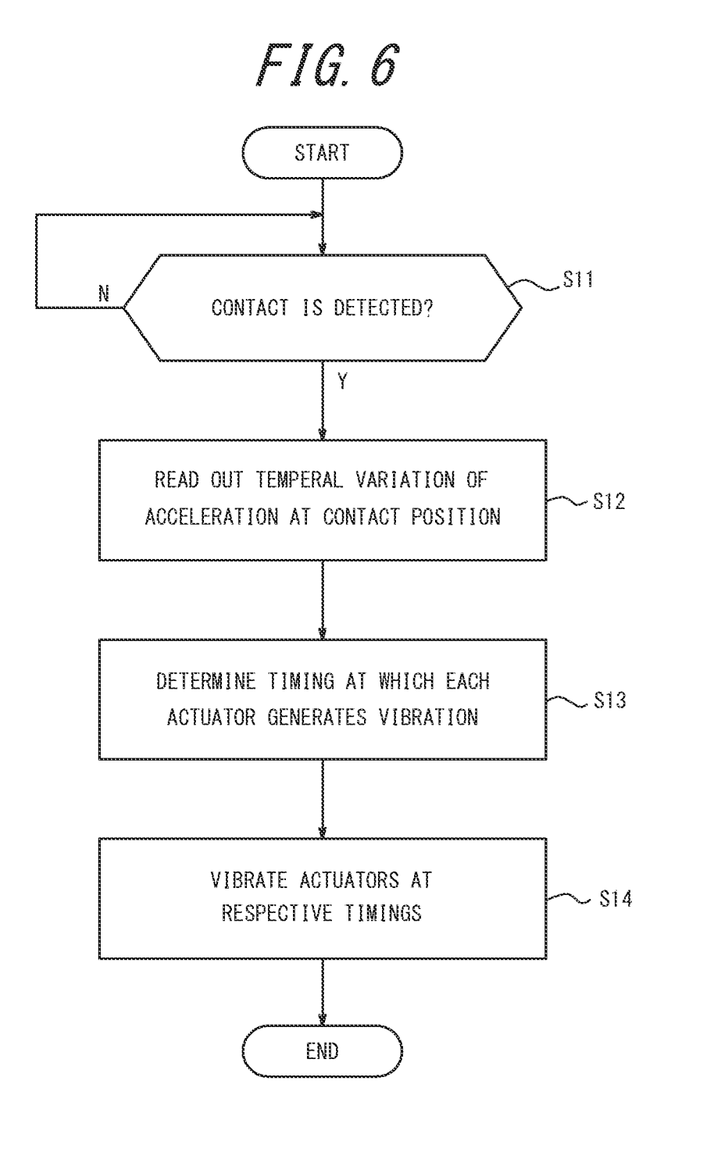
FIG. 6 is a flowchart illustrating the operation of the electronic apparatus according to the first embodiment.

FIG. 6 is a flowchart illustrating an operation of the electronic apparatus 1 according to the first embodiment. The operation illustrated in FIG. 6 may be started when the electronic apparatus 1 is ready to detect the operator's contact in respect to the panel 20 using the touch sensor 30. Upon start of the operation illustrated in FIG. 6, the touch sensor 30 of the electronic apparatus 1 determines whether the contact position on the panel 20 has been detected (step S11).

In a case in which the contact position on the panel 20 is not detected in step S11, the controller 10 loops an operation of step S11. On the other hand, in a case in which the contact position on the panel 20 is detected in step S11, the controller 10 reads the temporal variation of the acceleration at the contact position on the panel 20 detected by the touch sensor 30 from the memory 70 (step S12). In step S12, the controller 10 may read, for example, the temporal variations of the accelerations as illustrated in FIG. 5A to FIG. 5D from the memory 70.

When the controller 10 reads out the temporal variation of the acceleration in step S12, the controller 10 determines the timing at which each of the plurality of the actuators 50 generates the vibration (step S12). For example, in step S12 the controller 10 may control such that the timings at which the accelerations of the vibrations caused by the plurality of the actuators 50 become maximum are synchronized with the latest timing at which an acceleration of a vibration of one of the actuators becomes maximum. As described above, in the first embodiment the controller 10 delays the timing to drive at least one of the actuators 50 from the timing at which the contact position is detected on the panel 20. However, such a delay time can be as small as, for example, a few tens of microseconds. Thus, the delay time can be set to a time period that does not make the operator feel uncomfortable.

After determining the timing to generate the vibration by each of the actuators 50 in step S13, the controller 10 vibrates the actuators 50 at the respective timings (step S14). In step S14, at an appropriate timing, the controller 10 may transmit, for example, driving signals for vibrating the actuators 50 at respective timings.

As described above, in the electronic apparatus 1 according to the first embodiment, the controller 10 may start controlling the timing at which each of the plurality of the actuators 50 generates the vibration, upon detection of the contact position by the touch sensor 30.

Next, an electronic apparatus according to a second embodiment will be described with reference to the drawings.

Figure 7:
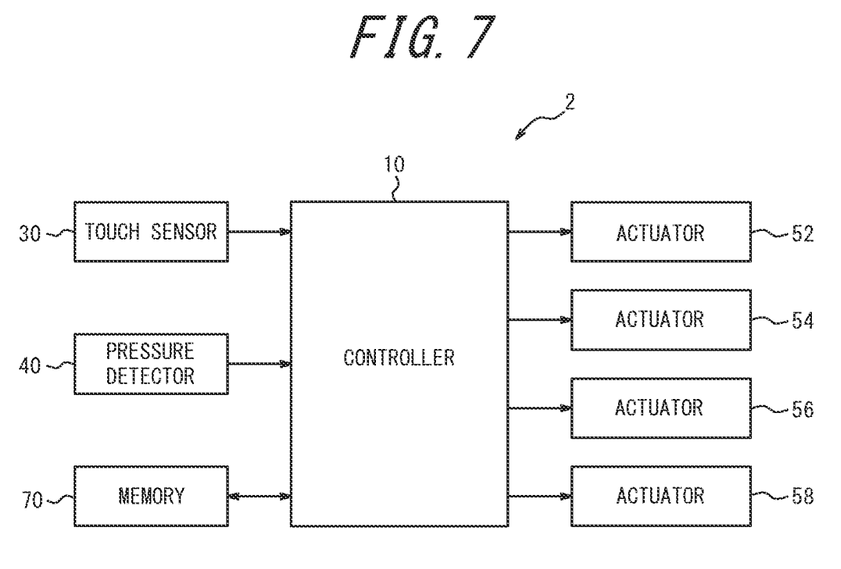
FIG. 7 is a functional block diagram illustrating a schematic configuration of an electronic apparatus according to a second embodiment.
Figure 8:
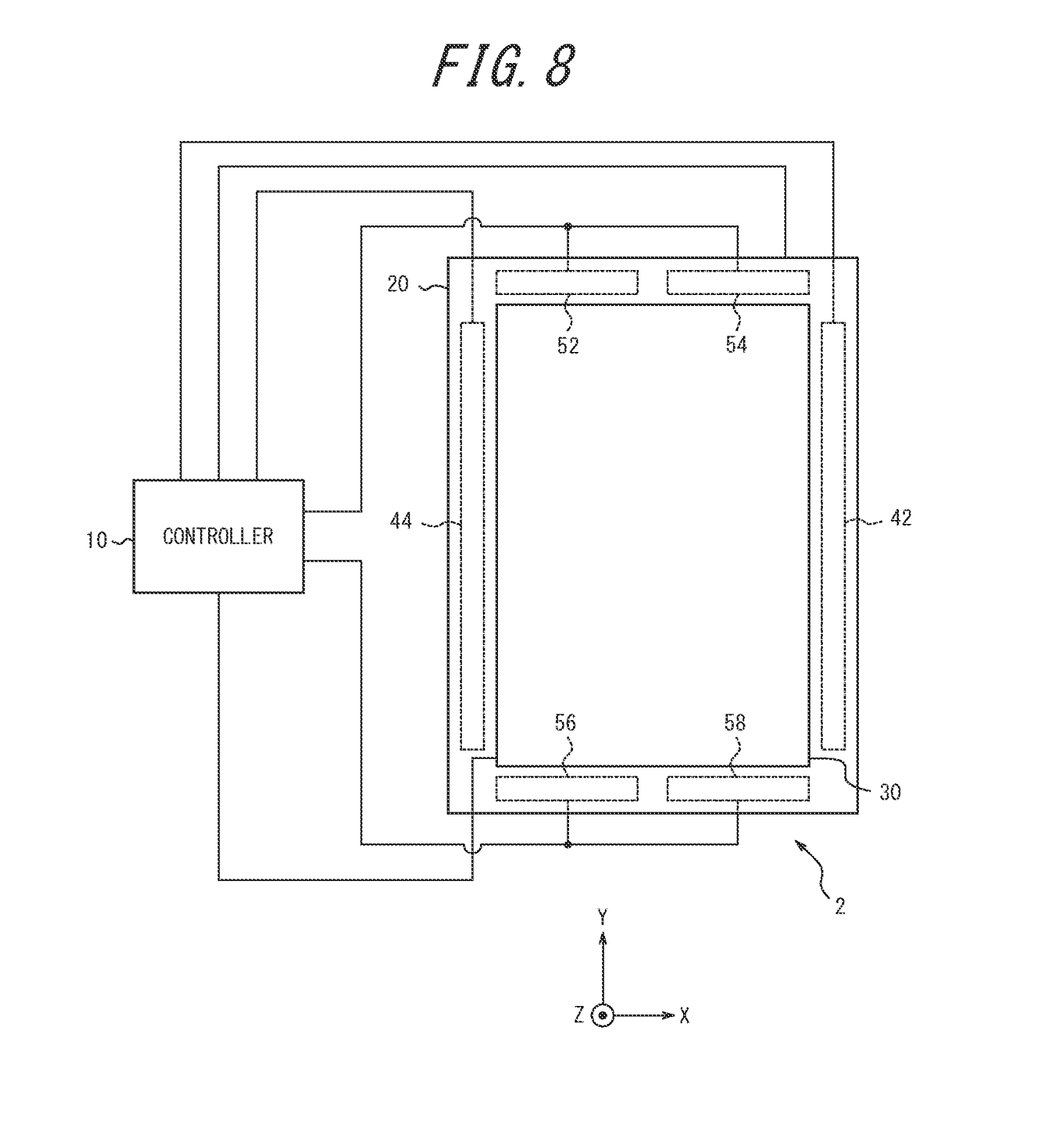
FIG. 8 is diagram illustrating an example arrangement of actuators and pressure detectors in the electronic apparatus according to the second embodiment.

FIG. 7 is a block diagram illustrating a schematic configuration of the electronic apparatus according to the second embodiment. FIG. 8 is a diagram illustrating an example arrangement of the actuators and pressure detectors in the electronic apparatus according to the second embodiment.

As illustrated in FIG. 7, the electronic apparatus 2 according to the second embodiment has a configuration in which the pressure detector 40 is added to the electronic apparatus 1 according to the first embodiment illustrated in FIG. 1. Other configurations of the electronic apparatus 2 may be the same as or similar to the electronic apparatus 1 according to the first embodiment. Hereinafter, thus, descriptions that are the same as or similar to the electronic apparatus 1 according to the first embodiment will be simplified or omitted as appropriate.

As illustrated in FIG. 7, the electronic apparatus 2 according to the second embodiment includes the pressure detector 40, The pressure detector 40 illustrated in FIG. 7 is illustrated as pressure detectors 42 and 44 in FIG. 8. Hereinafter, when a plurality of pressure detectors such as the pressure detector 42 and the pressure detector 44 are not distinguished from each other, they will be collectively referred to as "pressure detector 40", as appropriate.

The pressure detector 40 detects a pressure generated when the contact object contacts the panel 20 and presses the panel 20. That is, the pressure detector 40 detects the pressure applied to the panel 20. The pressure detector 40 may be configured using an element such as, for example, a strain gauge sensor or a piezoelectric element that has a physical or electrical characteristic (a strain, a resistance, a voltage, etc.) that changes according to the pressure and reacts linearly to a load. The pressure detector 40 outputs information regarding the pressure generated when the contact object presses the contact detection surface to the controller 10, based on the detection of the contact by the contact object in respect to the panel 20. From this output, the controller 10 can acquire the pressure detected by the pressure detector 40.

For example, in a case in which the pressing detector 40 is configured using a piezoelectric element, a magnitude of a voltage (a voltage value) output by the electrical characteristic of the piezoelectric element changes in accordance with a magnitude of a load (a force) related to the pressure applied to the contact surface of the panel 20 (or a speed (an acceleration) at which the magnitude of the load (the force) changes). In this case, the pressure detectors 40 can notify the controller 10 of the magnitude of the voltage (the voltage value), The controller 10 acquires the voltage value by receiving the voltage value from the pressure detector 40 or by detecting the voltage value related to the piezoelectric element of the pressure detector 40. That is, the controller 10 acquires the voltage value based on the pressing on the contact surface of the panel 20 by the operator, by acquiring the voltage value based on the pressing from the pressure detector 40.

In the configuration illustrated in FIG. 8, the two pressure detectors 42 and 44 are arranged in the vicinity of the edges of the panel 20 in parallel with the Y-axis direction illustrated in the figure. In FIG. 8, the pressure detectors 42 and 44 are illustrated by broken lines to indicate that they are provided on the rear surface side (the back surface side, i.e., the negative Z-axis direction side) of the panel 20. The arrangement of the pressing detectors 42 and 44 is not limited to an example illustrated in FIG. 8 and may vary depending on various factors including a shape and an arrangement manner of the panel 20, a pressing mode to be detected by the panel 20, a tactile sensation to be presented by the electronic apparatus 1, or the like. Further, the number of the pressure detectors 42 and 44 to be arranged is not limited to two and can be any number. The pressure detectors 42 and 44 are attached to the touch sensor 30 by joining members (e.g., double-sided tapes). The pressure detectors 42 and 44 may be attached to the panel 20 via intermediate members (e.g., sheet metal).

Figure 9:
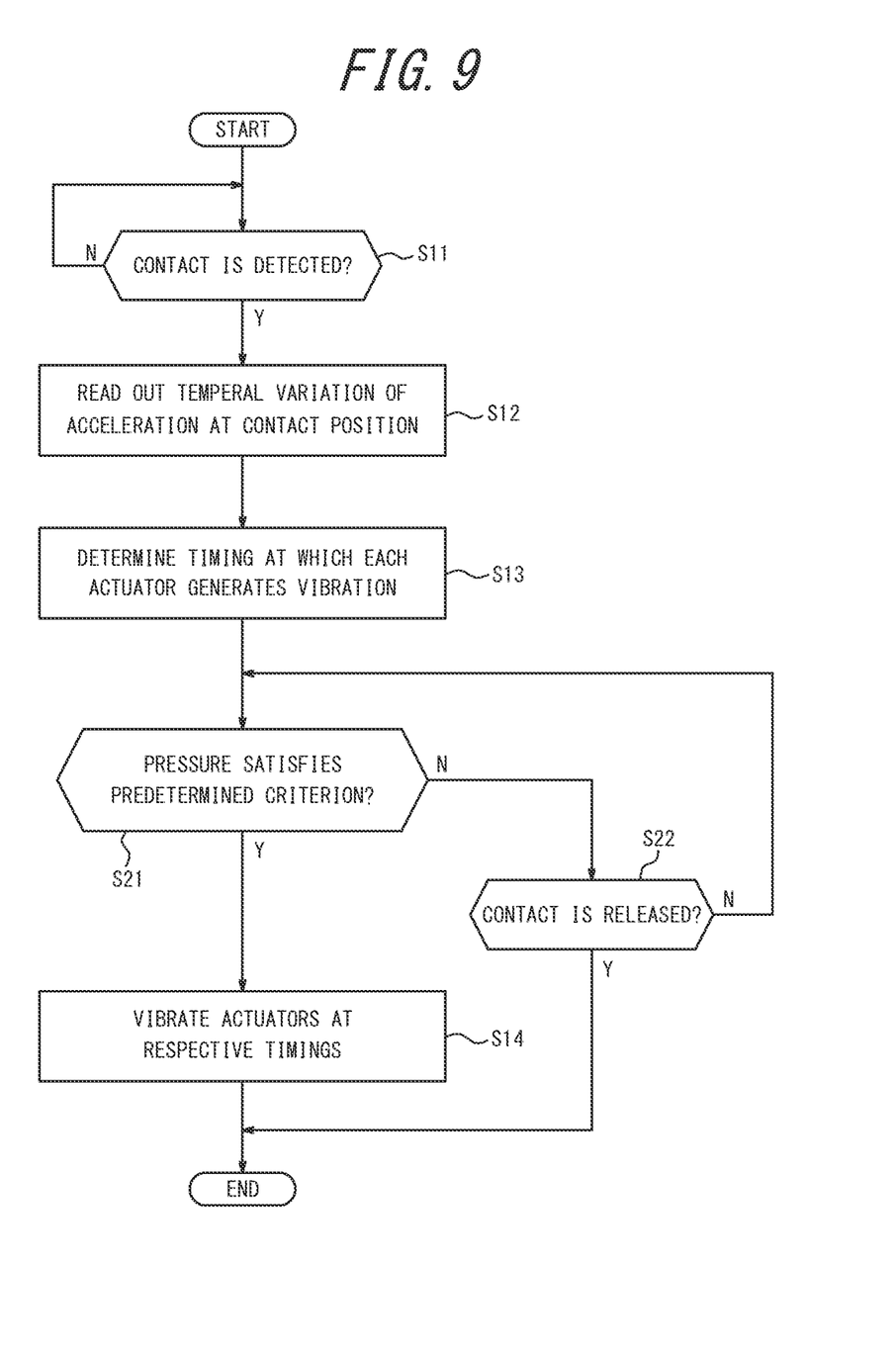
FIG. 9 is a flowchart illustrating an operation of the electronic apparatus according to the second embodiment.

FIG. 9 is a flowchart illustrating an operation of the electronic apparatus 2 according to the second embodiment. The operation illustrated in FIG. 9 may be started when the electronic apparatus 2 is ready to detect an operator's contact in respect to the panel 20, using the touch sensor 30. The operation illustrated in FIG. 9 is obtained by adding some steps to the operation described with reference to FIG. 6. Hereinafter, accordingly, descriptions that are the same as or similar to the electronic apparatus 1 according to the first embodiment described with reference to FIG. 6 will be simplified or omitted, as appropriate.

The operation from the start of the operation illustrated in FIG. 9 to step S13 is performed in the same manner as the electronic apparatus 1 according to the first embodiment illustrated in FIG. 6.

After determining the timing to generate the vibration from each of the actuators 50 in step S13, the controller 10 determines whether the pressure detected by the pressure detector 40 satisfies a predetermined criterion (step S21). In step S21, the predetermined criterion is, for example, a pressure that is to be detected by the pressure detector 40 and corresponds to 1N (Newton).

In a case in which the controller 10 determines that the pressure does not satisfy the predetermined criterion in step S21, the controller 10 determines whether the contact detected by the touch sensor 30 has been released (step S22). In a case in which the controller 10 determines that the contact has not been released in step S22, the controller 10 returns to step S21 and continues the process. In a case in which the controller 10 determines that the contact has been released in step S22, the controller 10 ends the operation illustrated in FIG. 9. In this case, the controller 10 determines that the operator stopped operating and ends the operation illustrated in FIG. 9 without controlling to drive the actuators 50.

On the other hand, in a case in which the controller 10 determines that the pressure satisfies the predetermined criterion in step S21, the controller 10 vibrates the actuators 50 at the respective timings (step S14). In step S14, at an appropriate timing the controller 10 may transmit, for example, driving signals for vibrating the actuators 50 at the respective timings.

In the electronic apparatus 2 according to the second embodiment, as described above, in a case in which the pressure detected by the pressing detector 40 satisfies the predetermined criteria in a state in which the contact position is being detected, the controller 10 may start controlling the timing at which each of the plurality of the actuators 50 generates the vibration.

In the second embodiment, the pressure detectors 42 and 44 may detect a load from, for example, an average value of outputs from the two pressure detectors 42 and 44. Here, the voltage value that satisfies the predetermined criteria may be set in advance such that a voltage value of, for example, 1N (Newton) output from the pressing detection units 42 and 44 satisfies the predetermined criteria, based on a pressing load applied when the operator performs a normal pressing operation. This settings may be changed thereafter as appropriate, according to a user's preference. Further, the predetermined criterion may be set to be not satisfied by a very small pressing load, so as to avoid recognizing an operation such as a light contact unintentionally made by the operator as an input and also to provide a sense of pressure that presents the realistic tactile sensation.

Next, an electronic apparatus according to a third embodiment will be described.

Figure 10:
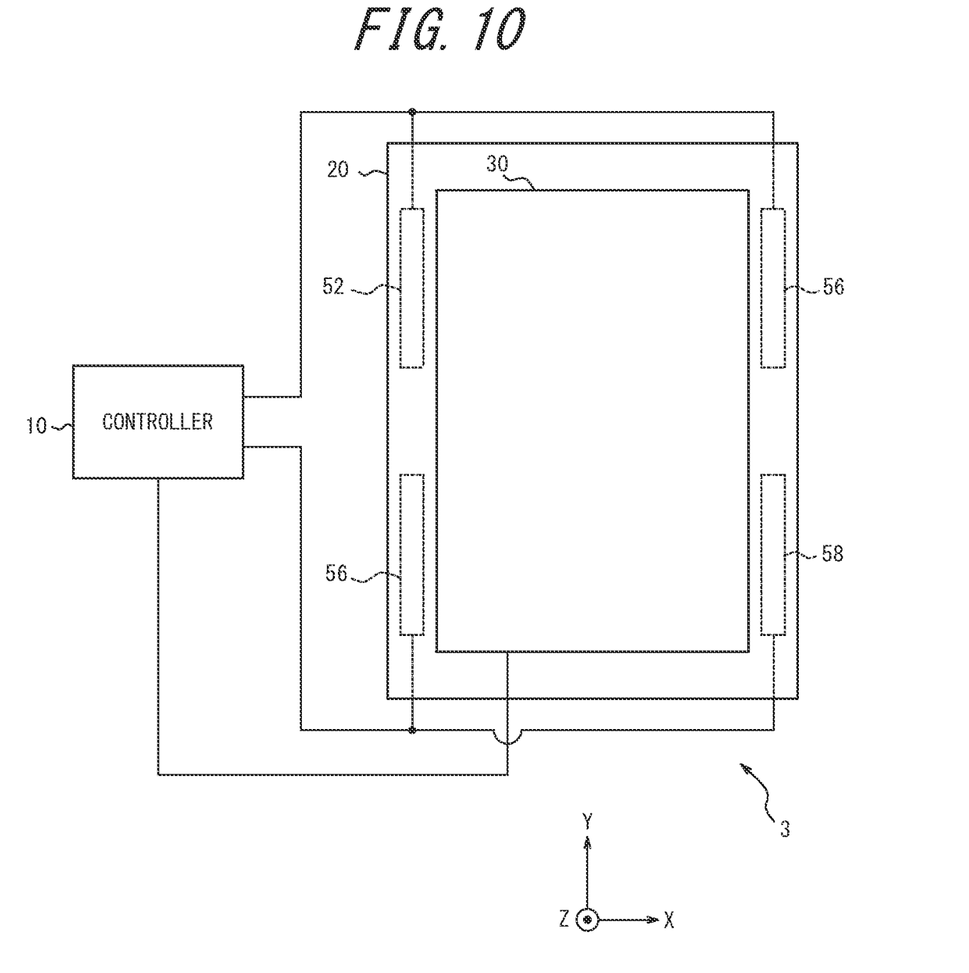
FIG. 10 is a diagram illustrating an example arrangement of actuators in an electronic apparatus according to a third embodiment.

FIG. 10 is a diagram illustrating an example arrangement of the actuators and the pressure detectors in the electronic apparatus according to the third embodiment.

As illustrated in FIG. 10, the electronic apparatus 3 according to the third embodiment causes the actuators 50 to function as the pressure detector 40 as well in the electronic apparatus 1 according to the first embodiment illustrated in FIG. 1. Other configurations may be the same as or similar to the electronic apparatus 1 according to the first embodiment or the electronic apparatus 2 according to the second embodiment. Hereinafter, thus, descriptions that are the same as or similar to the electronic apparatus 1 according to the first embodiment or the electronic apparatus 2 according to the second embodiment will be simplified or omitted, as appropriate.

As illustrated in FIG. 10, the electronic apparatus 3 according to the third embodiment includes the four actuators 50 arranged at the same positions as those of the electronic apparatus 2 according to the second embodiment illustrated in FIG. 8. The arrangement of the actuator 50 is not limited to an example illustrated in FIG. 10 and may vary depending on various factors including the shape and the arrangement manner of the panel 20, a pressing mode to be detected by the panel 20, and a tactile sensation to be presented by the electronic apparatus 3, or the like. Further, the number of the actuators 50 to be arranged is not limited to four and can be any number.

In the electronic apparatus 3 according to the third embodiment, the actuator 50 has a function of vibrating the panel 20, in the same manner as those of the electronic apparatus 1 according to the first embodiment. Further, in the electronic apparatus 3 according to the third embodiment, the actuator 50 also has a function of detecting the pressure applied to the panel 20, in a manner similar to the pressure detector 40 of the electronic apparatus 2 according to the second embodiment.

In a case in which the pressure detector 40 is configured using a piezoelectric element, by supplying a predetermined driving signal to the piezoelectric element from the controller 10, the piezoelectric element can be vibrated to present a tactile sensation to the operator's finger or the like. In the present embodiment, thus, the pressure detector 40 can also function as the actuator 50. That is, by configuring the pressure detector 40 using the piezoelectric element, the pressure detector 40 can also function as the actuator 50.

Although the disclosure has been described based on the figures and the embodiments, it is to he understood that various changes and modifications may he implemented based on the present disclosure by those who are ordinarily skilled in the art. Accordingly, such changes and modifications are to be included in the scope of the disclosure herein. For example, the functions included in each of the units, means or steps may be rearranged avoiding a logical inconsistency, such that a plurality of units or steps are combined, or one unit or step is subdivided. Also, each of the above embodiments does not need to be practiced strictly following the description thereof but may be implemented by appropriately combining or partially omitting features.

REFERENCE SIGNS LIST 1, 2, 3 electronic apparatus
10 controller
20 panel
30 touch sensor
40 (42, 44) pressure detector
50 (52, 54, 56, 58) actuator
61 to 66 support point
70 memory

The invention claimed is:

1. An electronic apparatus comprising:
a panel;
a touch sensor configured to detect a contact position on the panel;
a plurality of the actuators each configured to transmit vibration to the panel; and
a controller configured to:
control the plurality of the actuators such that accelerations of vibrations transmitted to the panel by the plurality of the actuators are maximized in one vibration direction perpendicular to the panel at the contact position with a same timing, control a timing at which each of the plurality of the actuators generates a vibration such that the accelerations of the vibrations transmitted to the panel from the plurality of the actuators are maximized at the contact position with the same timing, and adjust a timing at which at least one of the plurality of the actuators generates a vibration, according to a time when the vibration generated by each of the plurality of the actuators reaches the contact position.

2. The electronic apparatus according to claim 1, comprising:

a memory configured to store a temporal variation of an acceleration of a vibration transmitted to the panel from each of the plurality of the actuators, with respect to a plurality of positions on the panel.

3. The electronic apparatus according to claim 1, wherein the controller is configured to start controlling a timing at which each of the plurality of the actuators generates a vibration in response to detection of a contact position.

4. The electronic apparatus according to claim 1, comprising:

a pressure detector configured to detect a pressure applied to the panel, wherein the controller is configured to start controlling a timing at which each of the plurality of the actuators generates a vibration when a pressure detected by the pressure detector satisfies a predetermined criterion in a state in which the contact position is being detected.

5. The electronic apparatus according to claim 1, wherein the controller is configured to control the plurality of actuators such that increases from minimum values to maximum values of the accelerations of vibrations transmitted to the panel from the plurality of the actuators are maximized at the contact position with the same timing.

6. The electronic apparatus according to claim 1, wherein the controller is configured to control the plurality of actuators such that the accelerations of vibrations transmitted to the panel from the plurality of the actuators are maximized at the contact position within a predetermined time period including the same timing.

7. The electronic apparatus according to claim 1, wherein the accelerations of the vibrations to the panel by the plurality of the actuators are rates of changes of the velocities of the vibrations transmitted to the panel by the plurality of the actuators with respect to time.

8. The electronic apparatus according to claim 7, wherein the velocities of the vibrations are rates of changes of the displacements of the vibrations transmitted to the panel by the plurality of the actuators with respect to time.

* * * * *